United States Patent
Krapp et al.

(10) Patent No.: US 8,358,116 B2
(45) Date of Patent: Jan. 22, 2013

(54) DC/DC CONVERTER

(75) Inventors: Oliver Krapp, Niestertal (DE);
Klaus-Dieter Grebner, Markt Rodach (DE)

(73) Assignee: Lear Corporation GmbH, Allershausen-Leonhardsbuch (DE)

(*) Notice: Subject to any disclaimer, the term of this patent is extended or adjusted under 35 U.S.C. 154(b) by 182 days.

(21) Appl. No.: 12/786,045

(22) Filed: May 24, 2010
(Under 37 CFR 1.47)

(65) Prior Publication Data
US 2011/0089843 A1    Apr. 21, 2011

(30) Foreign Application Priority Data
Apr. 30, 2009  (DE) .......................... 10 2009 003 852

(51) Int. Cl.
*G05F 1/40*    (2006.01)

(52) U.S. Cl. .................... 323/282; 323/222; 323/224

(58) Field of Classification Search .......... 323/222, 323/223, 225, 265, 268, 271, 282, 285, 290; 363/81, 82, 84, 89, 125, 127
See application file for complete search history.

(56) References Cited

U.S. PATENT DOCUMENTS

| | | | | |
|---|---|---|---|---|
| 4,841,220 A * | 6/1989 | Tabisz et al. | ................... | 323/282 |
| 7,332,897 B2 * | 2/2008 | Lee et al. | ...................... | 323/222 |
| 7,358,706 B2 * | 4/2008 | Lys | ............................... | 323/222 |
| 8,120,341 B2 * | 2/2012 | Melanson | ..................... | 323/282 |
| 2003/0173940 A1 * | 9/2003 | Kovarik et al. | ............... | 323/282 |
| 2009/0251065 A1 | 10/2009 | Niedermeier et al. | | |
| 2010/0013411 A1 | 1/2010 | Krespach et al. | | |

FOREIGN PATENT DOCUMENTS
DE    20 2007 011 97 U1    1/2009

* cited by examiner

*Primary Examiner* — Tung X Le
(74) *Attorney, Agent, or Firm* — MacMillan, Sobanski & Todd, LLC (57) ABSTRACT

A DC/DC converter converts an input DC voltage into an output DC voltage. The DC/DC converter includes an input capacitor, an inductor, an electronic switch, a diode, an output capacitor and a control unit, wherein the control unit controls the first electronic switch as a function of the signals fed to the control unit. The input capacitor is connected between the input voltage and ground or zero point, and the inductor is connected between the input capacitor and the electronic switch. A second electronic switch, which the control unit can drive by means of a switching signal, is disposed between the load and the ground or zero point, and a second diode embodies a connection between the output of the load and the input capacitor. The control unit is fed the value of the input voltage.

11 Claims, 10 Drawing Sheets

DC/DC CONVERTER

CROSS-REFERENCE TO RELATED APPLICATIONS

This application claims the benefit of German Patent Application No. 10 2009 003 852.3 filed Apr. 30, 2009, the disclosure of which is incorporated herein by reference.

BACKGROUND OF THE INVENTION

The present invention relates to a DC/DC converter for operating a load, especially an electrical load comprising light-illuminating diodes or LEDs.

Constant-current sources are primarily used to control an electrical load, especially a load of LEDs, LED chains and/or LED arrays. Diverse arrangements of LEDs are known; besides parallel and matrix connection of LEDs, the possibility of series connection of LEDs is known. In a series connection of LEDs, all LEDs are connected behind one another in a row; this connection is also called an LED chain. In order to operate LED chains, a constant current is generated and conducted through the LEDs. A voltage that corresponds to the sum of the forward voltages of all LEDs then appears across the LEDs.

To achieve a constant luminous efficacy, the current that flows through the LEDs must be controlled in a temperature-dependent manner and nearly constant. This control is achieved in a known manner using pulse width modulation of the supplied current. This modulated current is then used for brightness control of the LED chain by means of pulse width modulation.

The energy supply of the LEDS is accomplished, for example, by means of a step-up converter.

An LED cluster arrangement that is supplied with constant current is known from DE 20 2007 011 973 U1. The LED cluster arrangement is controlled by pulse width modulation.

DE 2006 059 355 A1 discloses a control device in a method for operating a series connection of light-emitting diodes.

DE 10 2005 058 484 A1 discloses a circuit arrangement and a method for operating at least one LED.

Problematic in the known state of the art, however, is that a substantial expense is required in regard to the number of components to be used and in regard to the brightness control of the LEDs. In particular, the known prior art disregards high flexibility in regard to the ratio of input voltage to output voltage considering the usually necessary level of the output voltage to be achieved.

SUMMARY OF THE INVENTION

The object of the present invention is to provide a DC/DC converter that handles this problem. It is additionally the object of the present invention to provide a solution with the smallest possible number of components in order to achieve an inexpensive solution that saves space.

The present object is achieved on the basis of the characteristics of claim 1. Advantageous embodiments of the invention arise on the basis of the dependent claims and a concrete embodiment example based on a concrete circuit arrangement and device.

The DC/DC converter according to the invention serves for converting an input DC voltage into an output DC voltage. The DC/DC converter comprises an input capacitor, an inductor, a first electronic switch, a diode, an output capacitor and a control unit. The control unit drives the first electronic switch as a function of the signals fed to the control unit, wherein a first signal is the current output voltage or the current output current of the DC/DC converter, this voltage dropping across an operated electrical load, and the second signal represents the desired voltage or the desired current to which the output voltage is supposed to be held nearly constant. The input capacitor is connected between the input voltage and ground or zero point, the inductor is connected between the input capacitor and the first electronic switch. The diode is disposed between the inductor and the output capacitor that is connected to ground or zero point. A second electronic switch, which the control unit can drive by means of a switching signal, is disposed between the load and the ground or zero point. A second diode forms a connection between the output of the load and the input capacitor. The control unit is fed the value of the input voltage.

It is advantageous that the control unit closes the second electronic switch on the basis of a switching signal when the input voltage is smaller than the output voltage, and the control unit opens the second electronic switch by means of the switching signal when the input voltage is greater than the output voltage. The second electronic switch can thereby be used to operate the DC/DC converter as a step-up converter to ground or zero point when the second electronic switch is closed and as a step-up converter to the input voltage when the second electronic switch is open.

The change-over between these operating modes of the DC/DC converter is performed in a load-dependent manner, i.e. as a function of the output voltage.

It is advantageous that the control unit uses hysteresis to achieve the change-over of the second electronic switch. No hard change-over therefore occurs and a possible surge is prevented at the same time.

It is advantageous that the output capacitor is not connected to ground or zero point, but in parallel to the load. This achieves better dynamic behavior of the DC/DC converter.

It is advantageous that a third electronic switch is connected on the voltage side between the output capacitor and the load. This makes it possible to protect the output capacitor from a discharge if the loads are modulated by a pulse-with-modulation signal.

In an advantageous embodiment of the invention, the third electronic switch can be driven by a pulse-width-modulated signal, wherein the third electronic switch can be switched on and off by the pulse-width modulated signal.

It is advantageous that, between the second electronic switch and ground or zero point, a measuring unit detects the current flowing through the second electronic switch, and that the measuring unit transmits the value of the current intensity to the control unit and the control unit opens the second electronic switch when a predefined current-intensity value is exceeded. This can protect the load from damage from an overcurrent, because the control unit will use the second electronic switch to interrupt the current supply when a predefined current intensity in or through the load is exceed.

In an advantageous embodiment of the invention, the measuring unit is a current sensing resistor, which is connected between ground or zero point and the output of the second electronic switch, or the measuring unit is a current sensing coil.

In an advantageous embodiment of the invention, the load is an electrical load comprising at least two point loads and controllable switches can switch the point loads on and off independently of one another.

In an advantageous embodiment of the invention, a point load is a diode array comprising at least two light-emitting diodes connected in parallel and/or connected in series and/or matrix-connected, or a point load is one light-emitting diode.

In an advantageous embodiment of the invention, the point loads are individually switched on or off in succession or together or in groups.

The invention will be described in more detail below on the basis of concrete embodiment examples based on FIG. 1 to FIG. 9. This description of the invention on the basis of concrete embodiment examples does not represent any limitation of the invention to one of the embodiment examples.

DETAILED DESCRIPTION OF THE PREFERRED EMBODIMENT

In the following description of the figures, the same reference characters for identical elements in the figures will be used for all of the figures. This will provide clarity and better understanding of the following concrete description of the invention based on figures FIG. 1 to FIG. 9.

The following description based on concrete embodiment examples will discuss a "control unit" and use the verb "to control." But at the same time, there will be no distinction between open-loop control and closed-loop control.

Figure 1:
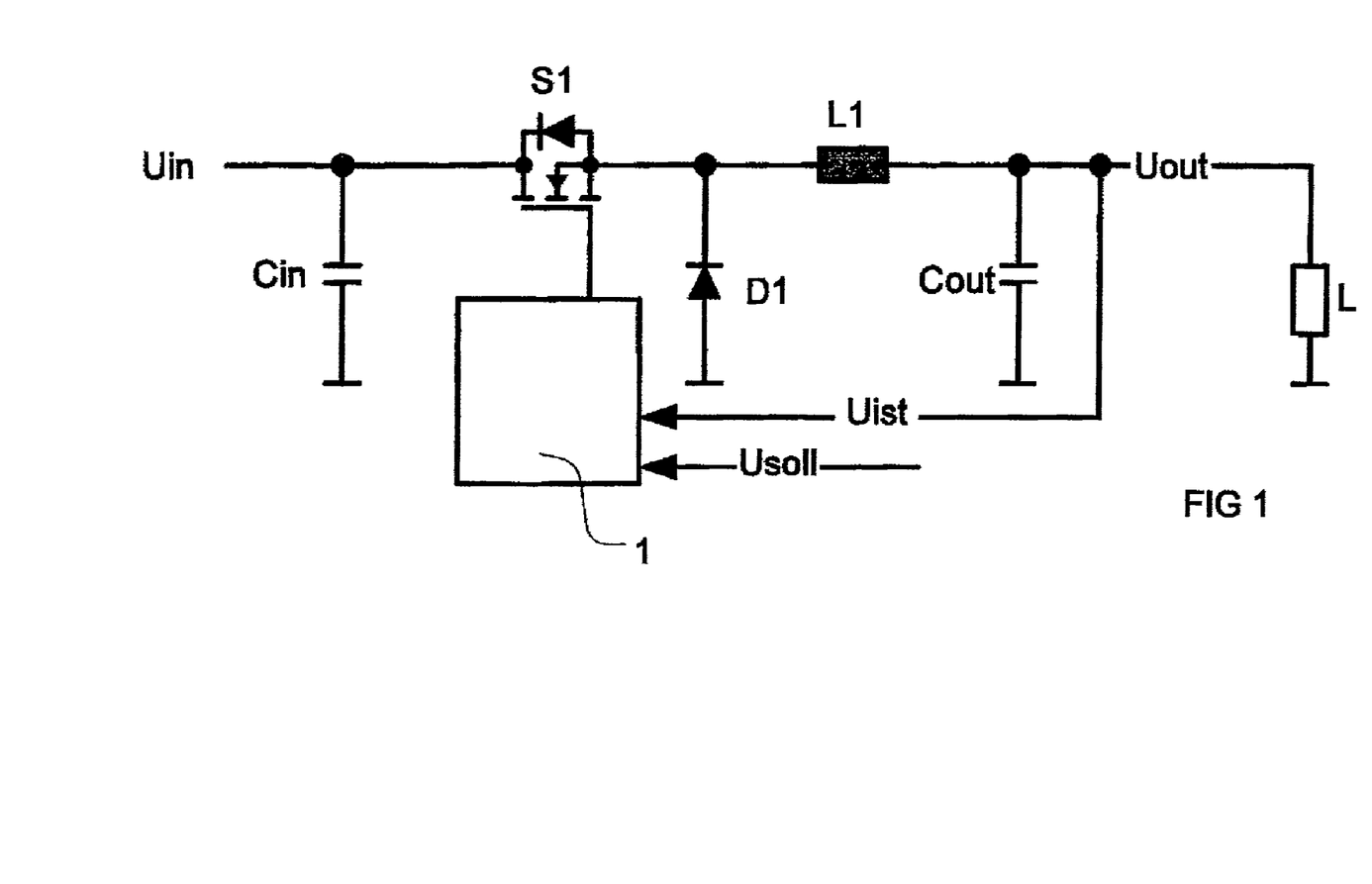
FIG. 1 is a DC/DC converter.

FIG. 1 shows a DC/DC converter in the form of a step-up converter. An input voltage Uin is fed to the step-up converter. An input capacitor Cin is at ground or zero point relative to the input voltage Uin. An electronic switch S1, which is driven by a control unit 1, is connected to the input capacitor Cin. The output of the electronic switch 1 leads to a diode D1, which leads to ground or zero point in the reverse direction. On the voltage side, an inductor L1, preferably a coil, is connected to the first diode D1. On the output side, an output capacitor Cout at the inductor L1 leads to ground or zero point. The voltage Uout, which drops across the load L, is across the output capacitor Cout, the load L being connected to ground or zero point. The load L drives a current with defined current intensity. This current is supposed to be nearly constant. In a preferred embodiment, the load L relates to a light-emitting diode or a plurality of light-emitting diodes that are connected in series, connected in parallel or are matrix-connected. In regard to the individual light-emitting diodes, it is advantageous for each to be provided with a controllable switch in parallel to the light-emitting diode so each individual light-emitting diode can be switched to the load L separately from the other light-emitting diodes.

The load L relates to an electrical load, preferably simply illuminants, preferably at least two light-emitting diodes that are connected in series, connected in parallel or are matrix-connected.

The value of the output voltage Uout is fed to the control unit 1, whereafter the control unit 1 is fed a setpoint Usoll for the voltage. Control unit 1 drives the switch S1 in such a manner that the output voltage Uout is adjusted nearly constant at the voltage value Usoll by means of the setpoint/actual-value comparison in control unit 1.

Control unit 1 is realized in the form of a microprocessor, a microprocessor unit, a microcomputer, a microcomputer unit, a microcontroller or a microcontroller unit.

If the load L changes, then control unit 1 corrects the output voltage Uout such that it is held nearly constant.

Figure 2:
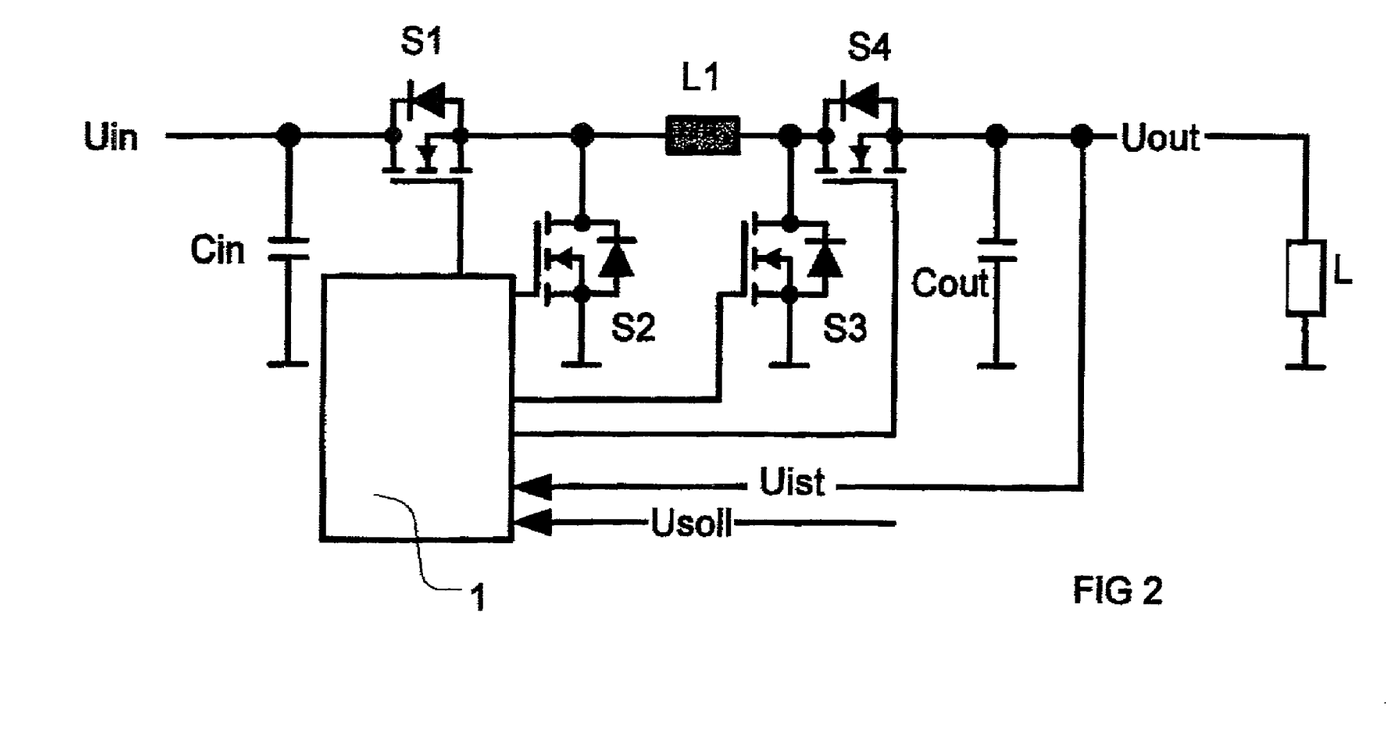
FIG. 2 is a DC/DC converter with four switches.

FIG. 2 illustrates a further DC/DC converter. This DC/DC converter is distinguished in that, in departure from the DC/DC converter of FIG. 1, four electronic switches S1, S2, S3 and S4 are used. In deviation from the DC/DC converter as per FIG. 1, the diode D1 is replaced by an electronic switch S2. The electronic switch S2 is driven by control unit 1. Moreover a third electronic switch S3 leads to ground or zero point after the inductor L1 and is driven by control unit 1. A fourth electronic switch S4, which is again driven by control unit 1, is inserted between the inductor L1 and the output capacitor Cout. This circuit embodiment allows the DC/DC converter to be operated both as a step-down and a step-up converter. This DC/DC converter is distinguished by a high efficiency.

Disadvantageous in this DC/DC converter, however, is the fact that a high expense is required for the electronic switches S1, S2, S3, S4, wherein the efficiency is substantially improved in the lower output range, however.

Figure 3:
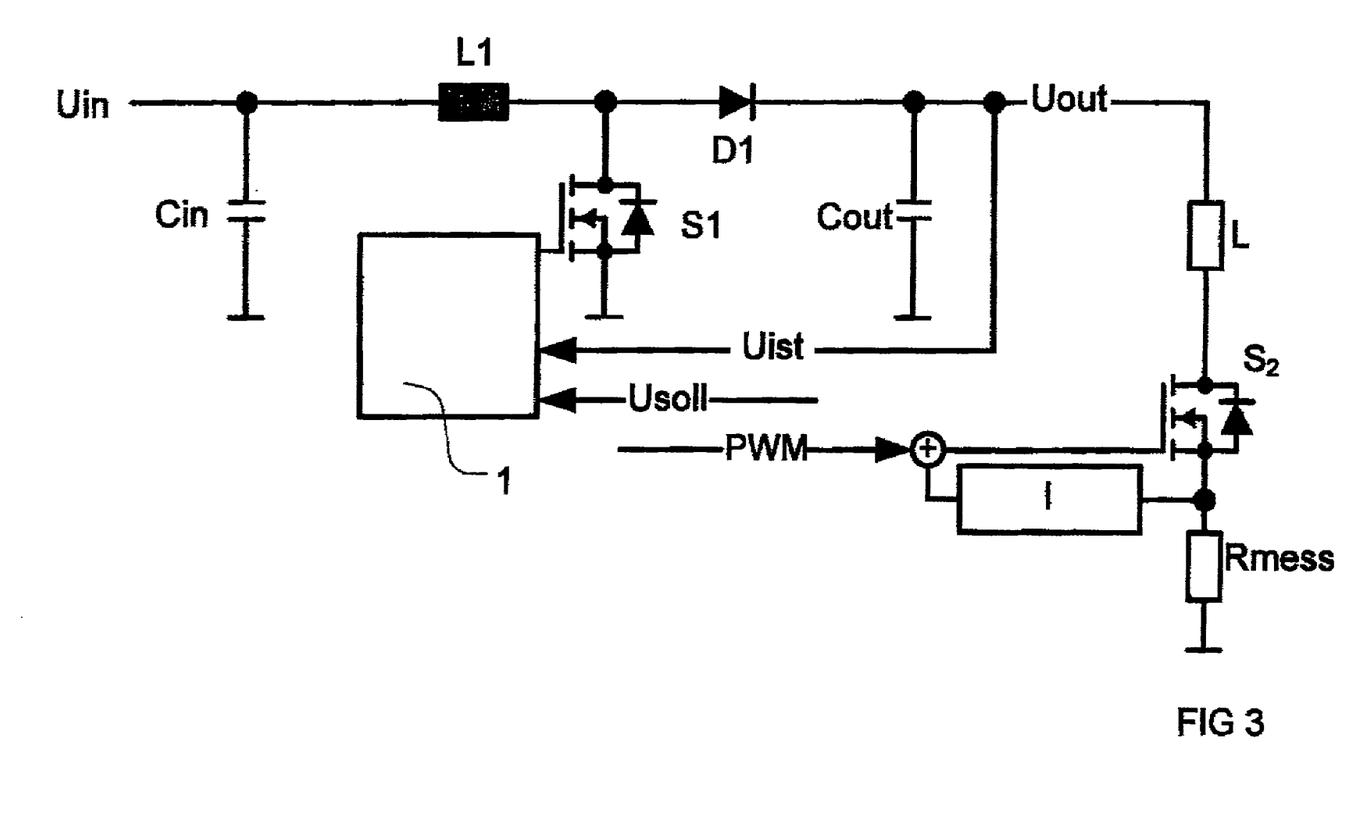
FIG. 3 is a DC/DC converter with overcurrent protection.

FIG. 3 depicts a further DC/DC converter. Here the input capacitor Cin is again disposed between the input voltage Uin and ground or zero point. Connected to the voltage side of input capacitor Cin is an inductor L1, preferably in the form of a coil, which has an electronic switch S1 to ground or zero point on its output side, this switch being controlled by control unit 1. On the voltage side, the coil L1 is connected to a diode D1 in the forward direction, wherein the output of the diode D1 is on the output capacitor Cout. The output capacitor Cout again leads to ground or zero point. The output voltage Uout drops across the capacitor Cout. A load L in series to the switch S2 and the current sensing resistor R is henceforth operated at the output voltage. The series circuit is in parallel with the output capacitor Cout. Control unit 1 is again fed the actual value of the output voltage Uist and a setpoint of the output voltage Usoll so that it can properly drive the electronic switch S1 so that the output voltage Uout is adjusted nearly constant to the setpoint Usoll. The load L again relates to diodes, especially light-emitting diodes, which are connected in series, connected in parallel, or matrix-connected. The second electronic switch S2 is driven by a pulse-width-modulation signal PWM. The pulse-width-modulation signal PWM serves for brightness control of the load L if and to the extent it consists of illuminants or light-emitting diodes as described above. The electronic switch S2 is closed and opened as a function of the pulse-width-modulation signal PWM, and the brightness of the light-emitting diodes is varied in this manner by controlling the current intensity that flows through the load L. A measurement of the load current is performed. The current sensing unit I performs this measurement by means of a current sensing coil or a by means of a current sensing resistor Rmess. If current sensing unit I detects an overcurrent, it will cast a signal on the pulse-width-modulation signal so that the electronic switch S2 will open in the event of overcurrent and thus interrupt a current flow through the load L.

Figure 4:
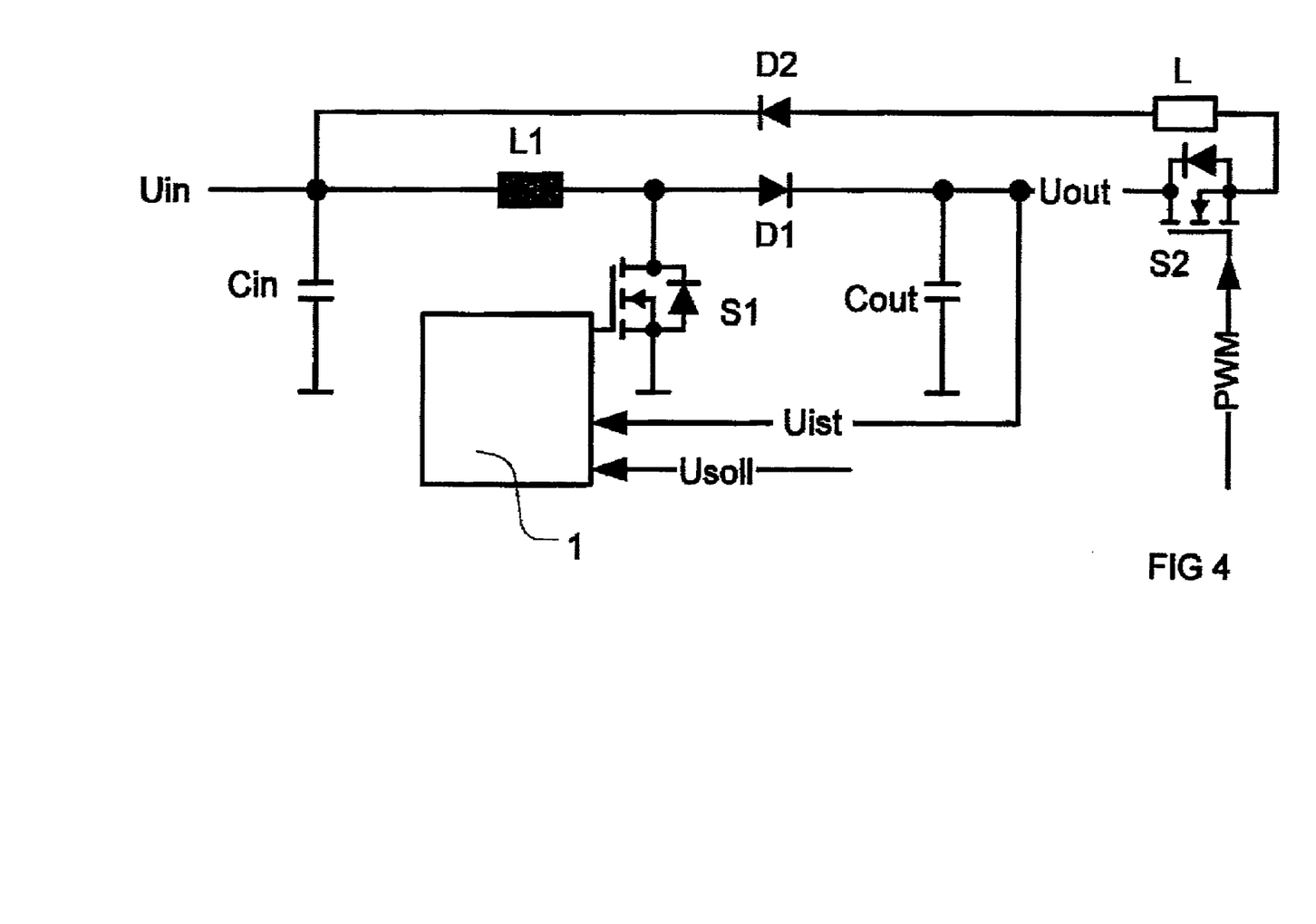
FIG. 4 is an additional DC/DC converter.

FIG. 4 depicts a further DC/DC converter in the form of a step-up converter. Here the input capacitor Cin is again disposed between input voltage Uin and ground or zero point. Connected to the voltage side of input capacitor Cin is an inductor is an inductor L1, preferably in the form of a coil, which has an electronic switch S1 to ground or zero point on the output side, this switch being driven by control unit 1. On the voltage side, the coil L1 is connected to a diode D1 in the forward direction, wherein the output of the diode D1 is on the output capacitor Cout. The output capacitor Cout again leads to ground or zero point. The output voltage Uout drops across the capacitor Cout.

The load L is henceforth within a feedback branch, protected by diode D2, connected to the input capacitor Cin at voltage potential Uin. The electronic switch S2 is connected between load L and the output voltage Uout. The electronic switch S2 is again driven by a pulse-width-modulation signal PWM, which is possibly used for brightness control of LEDs, as described above, which then represent the load L.

Figure 5:
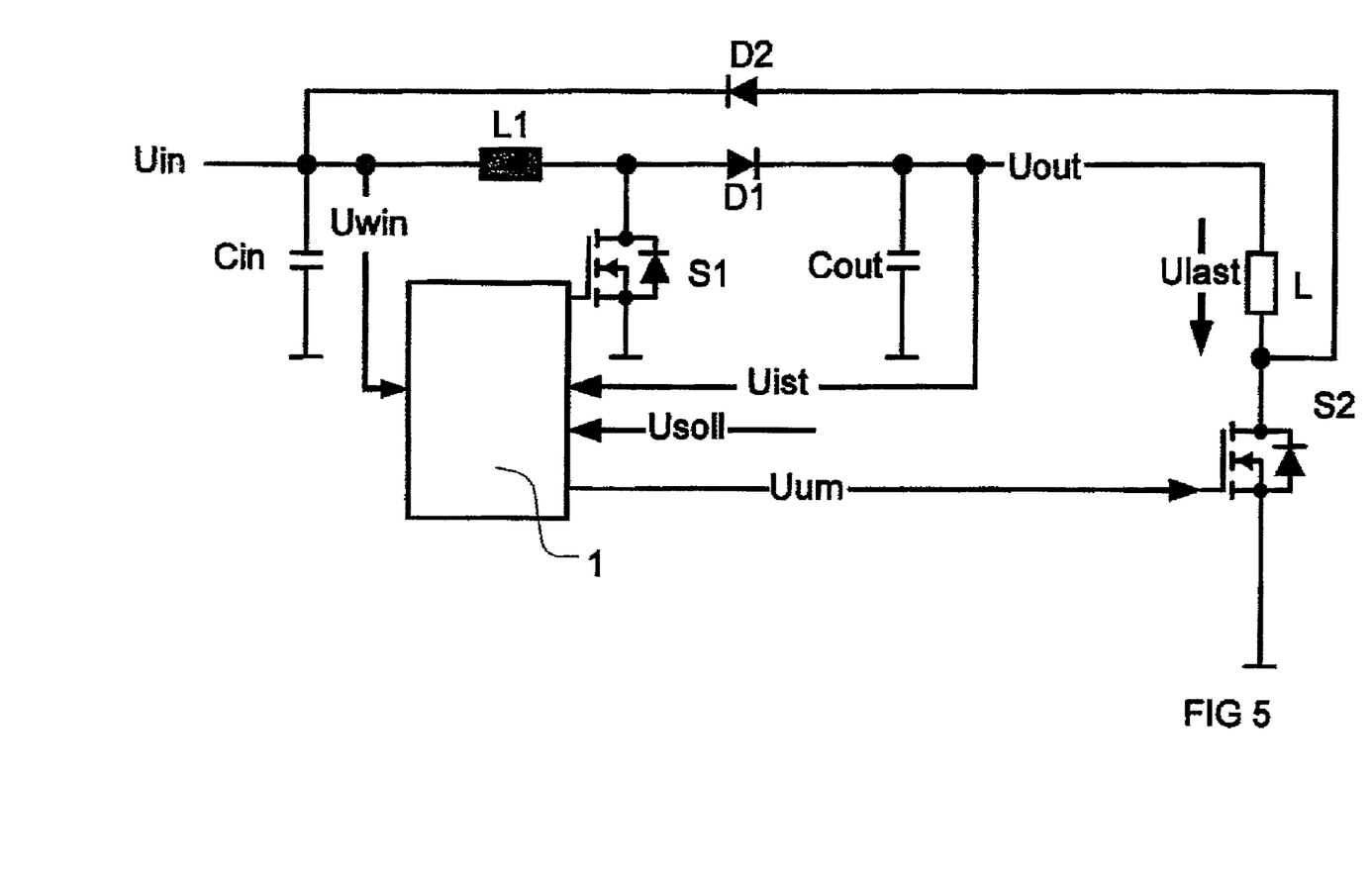
FIG. 5 is an additional DC/DC converter.

FIG. 5 depicts a further DC/DC converter. The DC/DC converter as per FIG. 5 is distinguished by high flexibility in regard to input/output voltage ratio, high efficiency, especially in the upper load range, a cost-optimized and component-reduced circuit arrangement with low space requirements. The DC/DC converter as per FIG. 5 again demonstrates an input capacitor Cin, which is disposed between the input voltage Uin and ground or zero point. Furthermore present is a control unit 1, which is fed the value of the output voltage Uout as actual-signal Uist and a setpoint Usoll for the load voltage as setpoint signal. At the same time, there is supplied a voltage value Uwin, as additional input signal representing the value of the input voltage Uin. The voltage side of capacitor Cin is connected to an inductor L1, preferably a coil. The output side of inductor L1 is connected to an electronic switch S1, which is connected to ground or zero point and receives its control signal from control unit 1. Furthermore, there is present a diode D1, which is connected in the forward direction and on the voltage side connects to the output capacitor Cout, which leads to ground or zero point on the output side. The output voltage Uout again drops across the output capacitor Cout. The load L is connected to the output voltage Uout. An electrical switch S2 connects the load L to ground or zero point, wherein the switch S2 is driven by a switching signal Uum from control unit 1. On the output side, a diode D2 connects the load L to the input capacitor Cin at the voltage potential Uin. Control unit 1 henceforth again adjusts the load voltage Ulast to a nearly constant value on the basis of the values Uist and Usoll fed to it in order to hold the load voltage Ulast nearly constant to the value Usoll. Afterwards, control unit 1 controls the switching signal Uum which drives the electronic switch S2. Control unit 1 switches the electronic switch S2 as a function of voltage. If the input voltage Uin lies below the load voltage Ulast, the electronic switch S2 is closed. The load current will thereby always discharge to ground or zero point. The load voltage will thereby nearly correspond to the output voltage Uout. If the input voltage Uin lies above the load voltage Ulast, the switch S2 is opened; the load current now flows across diode D2. The load voltage Ulast will thereby nearly correspond to the output voltage Uout minus the input voltage Uin. If the electronic switch S2 is closed, the DC/DC converter operates as a step-up converter in operation to ground or zero point; if the electronic switch S2 is open, the DC/DC converter operates as a step-up converter in operation at the input voltage Uin.

In the preceding embodiment of the DC/DC converter, the DC/DC converter runs at optimum efficiency in the upper output range and has good electromagnetic compatibility because of the accumulator coil L1 in the input path. The cost of components is small and flexibility in regard to input and output voltage is high.

Figure 6:
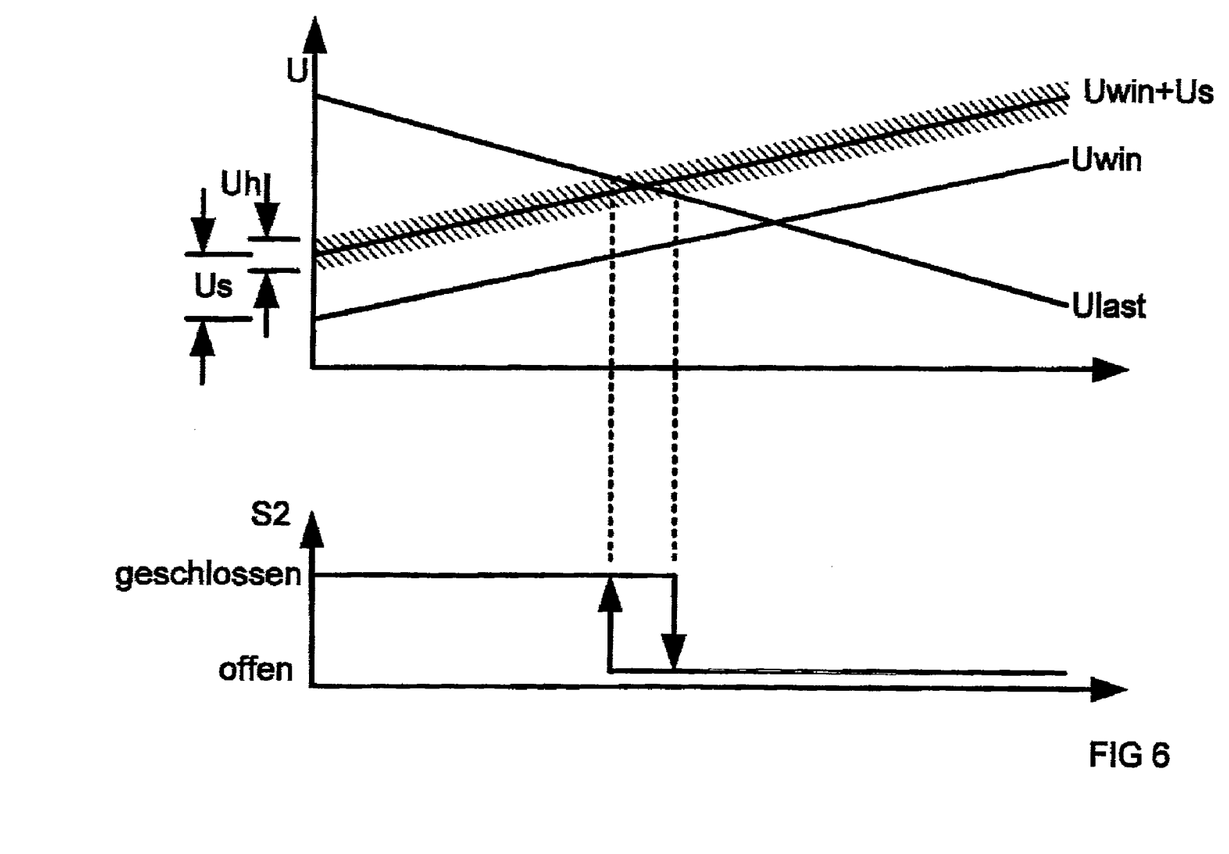
FIG. 6 is a voltage curve with hysteresis during the switchover.

Since it is not appropriate to perform a hard change-over when operating the DC/DC converter, a certain safety clearance is realized between the individual switch points so that hysteresis is allowed for the change-over of the electronic switch S2. This also prevents a surge on the DC/DC converter. FIG. 6 depicts such a switching hysteresis and change-over on the basis of the electronic switch S2. It plots the voltage curve at the load Ulast and the voltage curve of Uin. The hysteresis Uh and the resulting change-over voltage Us are defined. FIG. 6 gives the voltage curve, as plotted, that arises when such a hysteresis is implemented. The switching behavior of the electronic switch S2 is also illustrated.

Figure 7:
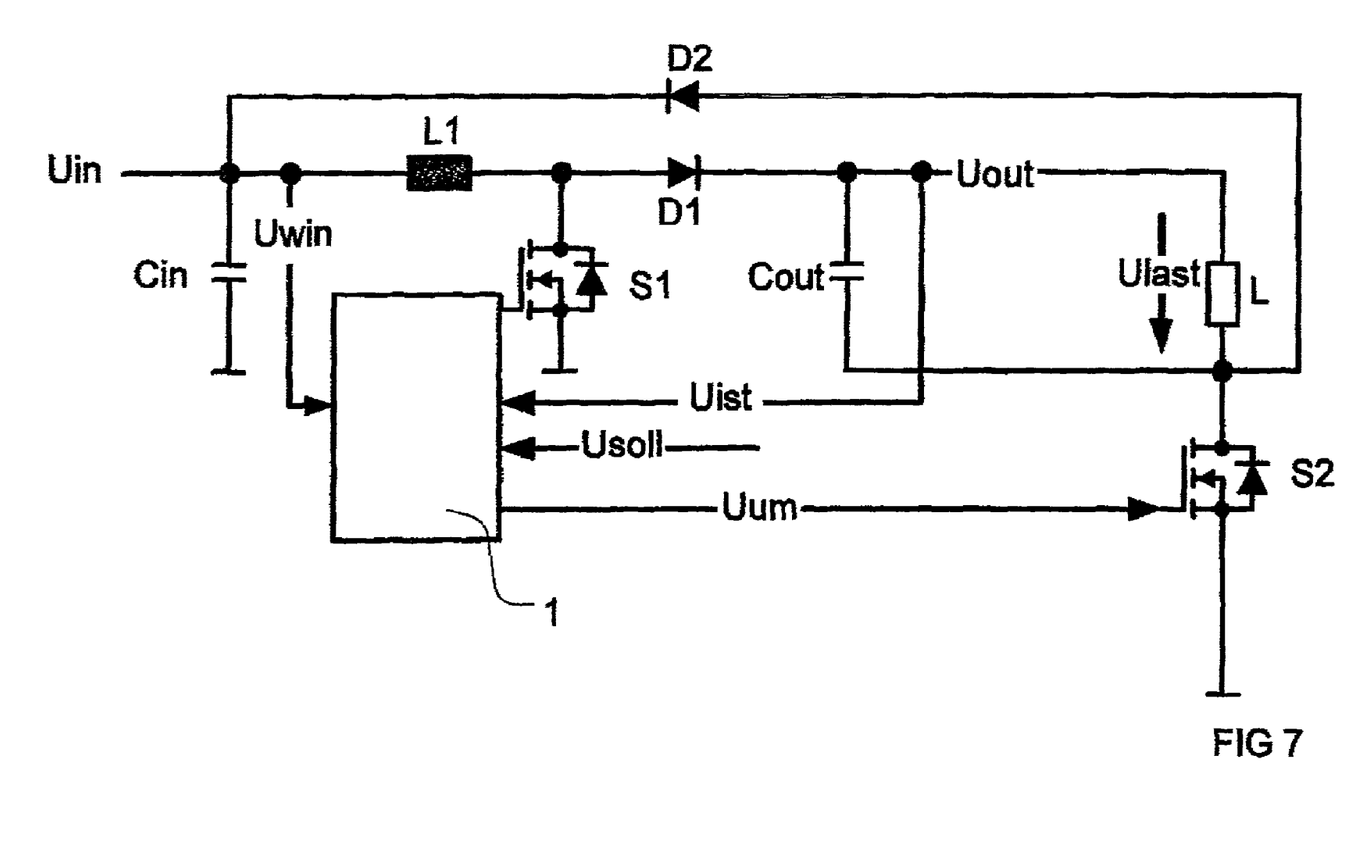
FIG. 7 is a DC/DC converter with alternative connection of the output capacitor.

FIG. 7 depicts an alternative embodiment of the DC/DC converter of FIG. 5. It illustrates an alternative connection of the output capacitor Cout. In FIG. 7, the output capacitor Cout is not connected to ground or zero point as in FIG. 5, but the output capacitor Cout is connected in parallel to the load L. This achieves a better, more dynamic behavior of the DC/DC converter. In other respects, the other mode of operation and embodiment of the DC/DC converter is analogous to the embodiment described in FIG. 5.

Figure 8:
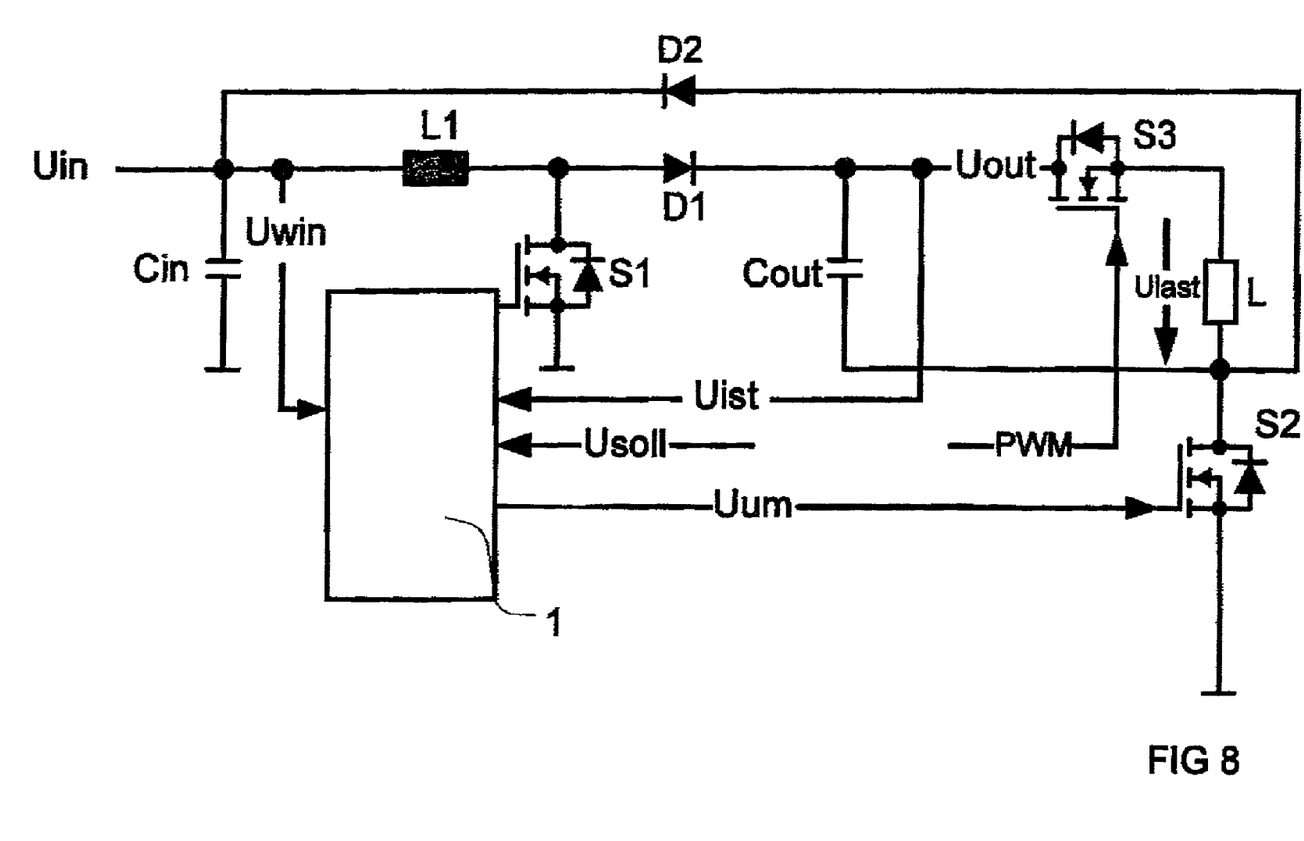
FIG. 8 is a DC/DC converter with pulse-width modulation control.

FIG. 8 depicts another embodiment of the DC/DC converter of FIG. 7. The DC/DC converter as per FIG. 8 takes into consideration the need for providing brightness control for loads in the form of illuminants, especially light-emitting diodes. This is achieved by connecting an electronic switch S3 to the load L upstream at the output Uout. This electronic switch S3 is switched by a pulse-width-modulation signal PWM. This pulse-width-modulation signal PWM represents the brightness control signal for the illuminants, especially light-emitting diodes, which represent the load L. The larger the pulse-width-modulation signal PWM, i.e. the smaller the intervals between individual pulses of the pulse-width-modulation signal PWM, the brighter the light-emitting diodes glow. The brightness control can be integrated in this simple manner.

Afterwards, control unit 1 controls the switching signal Uum, which drives the electronic switch S2. Control unit 1 switches the electronic switch S2 as a function of voltage. If the input voltage Uin lies below the load voltage Ulast, the electronic switch S2 is closed. The load current will thereby always discharge to ground or zero point. The load voltage will thereby nearly correspond to the output voltage Uout. If the input voltage Uin lies above the load voltage Ulast, the switch S2 is opened; the load current now flows across diode D2. The load voltage Ulast will thereby nearly correspond to the output voltage Uout minus the input voltage Uin. If the electronic switch S2 is closed, the DC/DC converter operates as a step-up converter in operation to ground or zero point; if the electronic switch S2 is open, the DC/DC converter operates as a step-up converter in operation at the input voltage Uin.

The electronic switch S3 also makes it possible to interrupt the load current. This is done, e.g. to protect the load L. In particular, the load L can be separated in the event of a short circuit of the output to ground or in the event of overvoltage.

It also allows the supply voltage to be used to dissipate or limit, e.g. a short circuit in the supply.

Figure 9:
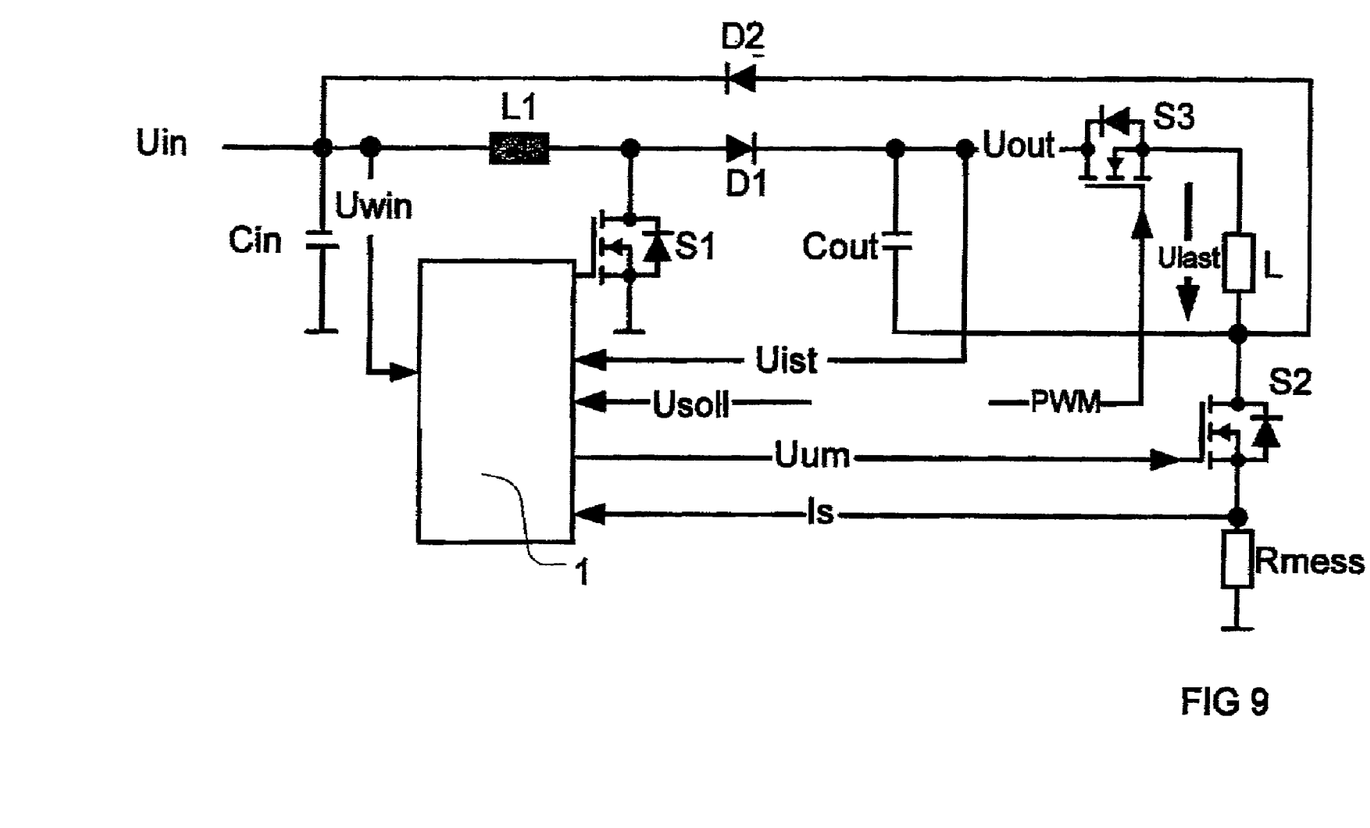
FIG. 9 is a DC/DC converter with load-current measurement.

FIG. 9 depicts a further embodiment of a DC/DC converter. This DC/DC converter is based on the embodiment as per FIG. 8, but in addition to the DC/DC converter as per FIG. 8, it makes it possible to measure the load current to ground. To this end, the current intensity that flows through the load L is sensed. The value of the current intensity is measured using a current measuring unit, preferably a current sensing coil or, as illustrated in FIG. 9, a current sensing resistor Rmess, and the value is fed to control unit 1 as the value Is. If a predefined maximum current-intensity value, which is stored in control unit 1, is exceeded, then control unit 1 drives the electronic switch S3 so that it opens and interrupts the current supply into load L. An additional protection for the load L can be implemented in this way.

Advantageous in the entire circuit arrangement is the fact that the components for switching the electrical load L to the different potentials conduct only the load current and not the peak current, which flows in the DC/DC converter.

Figure 10:
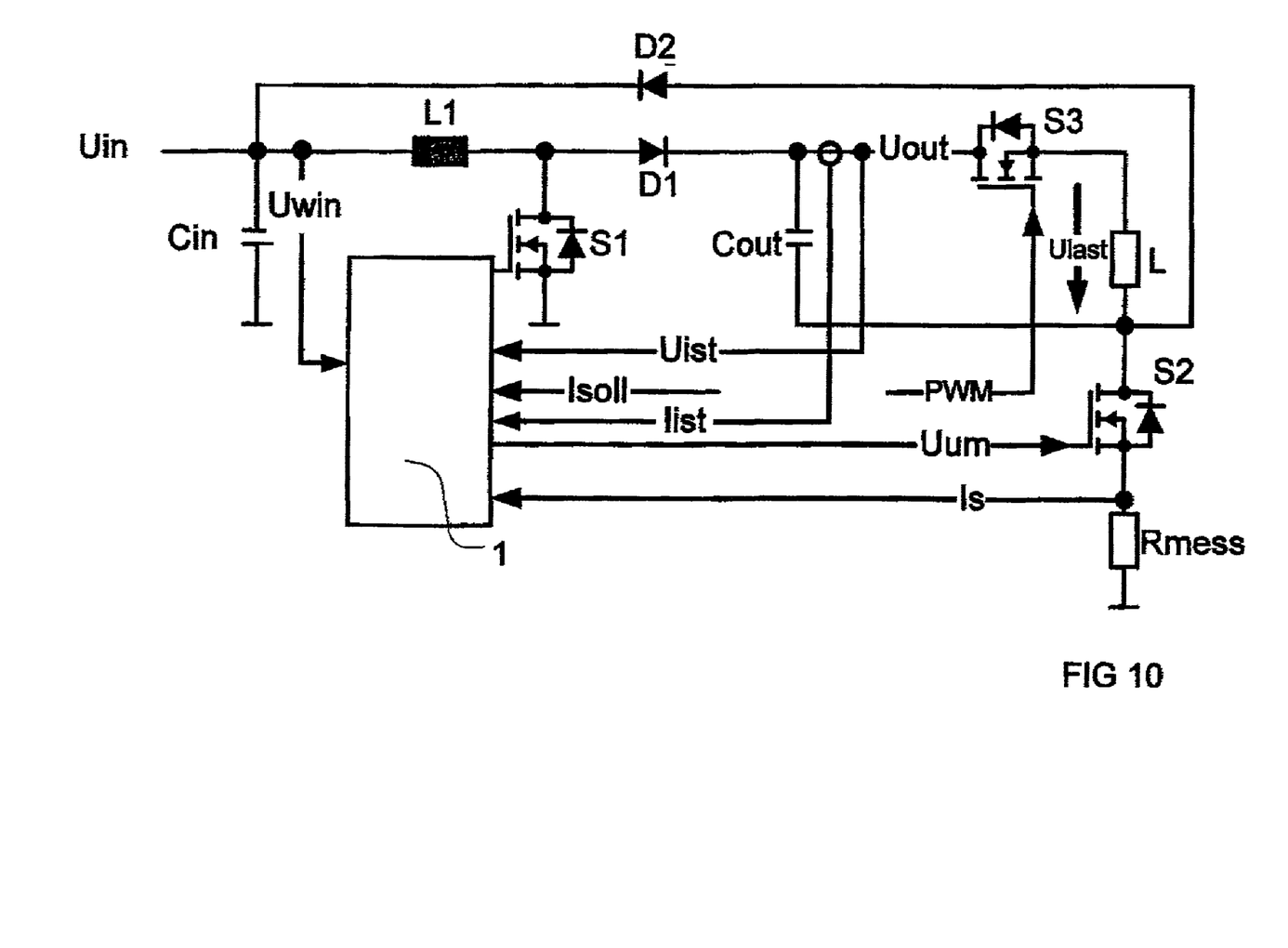
FIG. 10 is an additional DC/DC converter with load-current measurement.

FIG. 10 depicts a further embodiment of a DC/DC converter. This DC/DC converter is based on the embodiment as per FIG. 9. The illustrated controls use the output voltage Uout as controlled variable. Instead of this, the controller may also be embodied with the output current as the controlled variable, an embodiment which is advantageous when using LEDs as load L because of the current-voltage characteristics. For implementation, the desired current Isoll and the actual current list are specified instead of the desired voltage Usoll in FIG. 9 and the actual voltage Uist in FIG. 10. Both in the control of the output voltage and the control of the output current, the change-over is a consequence of a measurement of the output voltage Uout and input voltage Uwin.

What is claimed is:

1. A DC/DC converter for converting an input DC voltage into an output DC voltage comprising:
   an input capacitor,
   an inductor,
   a first electronic switch,
   a diode, an output capacitor, and
   a control unit,
   wherein the control unit drives the first electronic switch as a function of the signals fed to the control unit,
   wherein a first signal represents the current output voltage or the current output current and a second signal represents the desired voltage or the desired current,
   wherein the input capacitor is connected between the input voltage and ground or zero point, the inductor is connected between the input capacitor and the first electronic switch, and
   wherein the diode is disposed between the inductor and the output capacitor that is connected to ground or zero point,
   characterized in that a second electronic switch, which the control unit is configured to drive by means of a switching signal, is disposed between the load and the ground or zero point, and a second diode embodies a connection between the output of the load and the input capacitor, and the control unit is fed the value of the input voltage.

2. DC/DC converter according to claim 1, characterized in that the control unit closes the second electronic switch by means of a switching signal when the input voltage is smaller than the load voltage, and the control unit opens the second electronic switch by means of the switching signal when the input voltage is greater than the load voltage.

3. DC/DC converter according claim 2, characterized in that between the second electronic switch and ground or zero point, a measuring unit detects the current flowing through the second electronic switch, and that the measuring unit transmits the value of the current intensity to the control unit, and the control unit opens the second electronic switch when a predefined current-intensity value is exceeded.

4. DC/DC converter according to claim 3, characterized in that the measuring unit is a current sensing resistor, which is connected between ground or zero point and the output of the second electronic switch, or that the measuring unit is a current sensing coil.

5. DC/DC converter according to claim 1, characterized in that that the control unit uses hysteresis to achieve the change-over of the second electronic switch.

6. DC/DC converter according to claim 1, characterized in that that the output capacitor is not connected to ground or zero point, but in parallel to the load.

7. DC/DC converter according to claim 6, characterized in that a third electronic switch is connected on the voltage side between the output capacitor and the load.

8. DC/DC converter according to claim 7, characterized in that the third electronic switch is configured to be driven by a pulse-width-modulated signal PWM, wherein the third electronic switch is configured to be switched on and off by the pulse-width modulated signal.

9. DC/DC converter according to claim 1, characterized in that the load is an electrical load comprising at least two point loads and controllable switches is configured to switch the point loads on and off independently of one another.

10. DC/DC converter according to claim 1, characterized in that a point load is a diode array comprising at least two light-emitting diodes connected by at least one of (a) in parallel, (b) connected in series, or (c) matrix-connected, or a point load is one light-emitting diode.

11. DC/DC converter according to claim 1, characterized in that the point loads is configured to be individually switched on or off in succession or together or in groups.

* * * * *